United States Patent [19]

Hashimoto

[11] Patent Number: 4,665,876
[45] Date of Patent: May 19, 1987

[54] CONNECTOR HEAD CONSTRUCTION FOR HIGH-PRESSURE FUEL INJECTION TUBES

[75] Inventor: Yasuaki Hashimoto, Shizuoka, Japan

[73] Assignee: Usui Kokusai Sangyo Kabushiki Kaisha, Nagasawa, Japan

[21] Appl. No.: 621,444

[22] Filed: Jun. 18, 1984

[30] Foreign Application Priority Data

Jun. 7, 1984 [JP] Japan .............................. 59-84825[U]

[51] Int. Cl.⁴ ........................................... F02M 39/00
[52] U.S. Cl. .................... 123/468; 123/469; 285/354; 285/386
[58] Field of Search .............. 123/467, 468, 469, 470; 285/334.4, 354, 386, 114, DIG. 12

[56] References Cited

U.S. PATENT DOCUMENTS

| | | | |
|---|---|---|---|
| 1,021,485 | 3/1912 | Ross | 285/386 |
| 1,109,042 | 9/1914 | Claflin | 285/354 |
| 1,892,781 | 1/1933 | Hoenstine | 285/137 R |
| 2,480,496 | 8/1949 | Mercier | 285/386 |
| 3,116,944 | 1/1964 | Parker | 285/354 |
| 3,694,010 | 9/1972 | Callahan | 285/334.4 |
| 3,845,748 | 11/1974 | Eisenberg | 123/469 |

FOREIGN PATENT DOCUMENTS

| | | | |
|---|---|---|---|
| 2334445 | 5/1974 | Fed. Rep. of Germany | 123/469 |
| 1260967 | 12/1961 | France | 123/468 |
| 197708 | 8/1977 | U.S.S.R. | 123/470 |

*Primary Examiner*—Carl Stuart Miller
*Attorney, Agent, or Firm*—Anthony J. Casella; Gerald E. Hespos

[57] ABSTRACT

A connector head construction for a high-pressure fuel injection tube comprises a metal tube having a relatively large wall thickness and small diameter and including an abacus-bead-shaped connector head having a front outer peripheral pressor wall for engagement with a mating connector seat and a rear outer peripheral pressure-bearing wall for engagement with a fastening nut on the metal tube. The connector head includes an integral gradual slant surface extending as a skirt from a top of said pressure-bearing wall at an angle ranging from 2° to 5° to the axis of metal tube and having a length equal to at least an outside diameter of the metal tube.

5 Claims, 3 Drawing Figures

PRIOR ART

CONNECTOR HEAD CONSTRUCTION FOR HIGH-PRESSURE FUEL INJECTION TUBES

BACKGROUND OF THE INVENTION

1. Field of the Invention

The present invention relates to a connector head construction for a high-pressure fuel injection tube which is placed in a fuel supply passage in a diesel engine and has a relatively large wall thickness and small diameters such as an outside diameter of about 20 mm or less and an inside diameter ranging from 1.2 mm to 4 mm.

2. Description of the Prior Art

One conventional connector head construction for use in fuel injection tubes is illustrated in FIG. 2A of the accompanying drawings. A metal tube 11 of a large wall thickness has on a connecting end thereof a connector head 12 in the form of an abacus bead having a front outer peripheral pressor wall 13 and a rear outer peripheral pressure-bearing wall 14. The pressure-bearing wall 14 is defined by a steep slant surface 14' extending from a top portion to a lower neck portion. Another prior connector head construction shown in FIG. 2B includes a sleeve washer 17 fitted over a pressure-bearing wall 14 including a lower neck portion for engagement with a fastening nut 16.

However, the conventional connector head constructions have been disadvantageous in that since the pressure-bearing wall 14 is composed solely of the simple steep slant surface 14', the neck portion of the connector head 12 has an insufficient mechanical strength so that the neck portion will frequently be cracked or broken under engine vibrations during use or undue stresses produced upon forced connection of a product tube which is not bent to proper shape. The same problem arises even with the sleeve washer 17 fitted over the neck portion.

SUMMARY OF THE INVENTION

It is an object of the present invention to provide a connector head construction at an end of a high-pressure fuel injection tube, which will effectively eliminate the above prior drawback with a simple structure.

According to the present invention, a connector head construction on a fuel injection tube has a pressure-bearing wall and a gradual or gentle slope surface extending integrally from the skirt of a steep slant surface from a top of the pressure-bearing wall at an angle in the range of from 2° to 5° and having a length equal to or greater than the outside diameter of the fuel injection tube.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
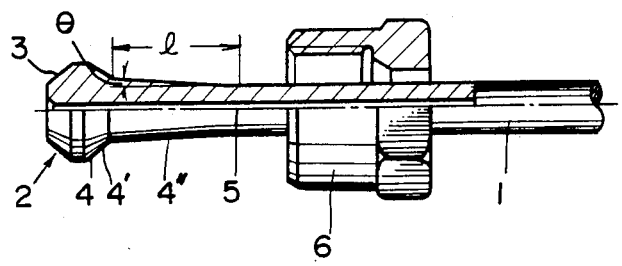
FIG. 1 is a fragmentary side elevational view, partly in cross section, of a connector head construction of the present invention.
Figure 2A:
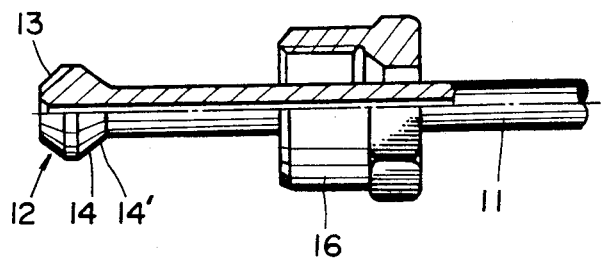
FIGS. 2A and 2B are fragmentary side elevational views, partly in cross section, of conventional connector head constructions.
Figure 2B:
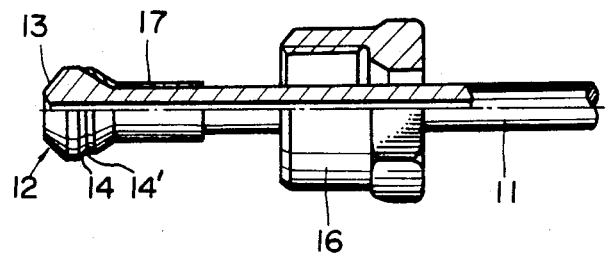

FIG. 1 shows a connector head construction according to the present invention.

A metal tube 2 has a relatively large wall thickness and small diameters, such as an inside diameter in the range of from about 1.2 mm to 4 mm and an outside diameter of about 20 mm or smaller. The metal tube 1 has on one end thereof an abacus-bead-shaped connector head 2 having a front outer peripheral pressor wall 3 for abutment against a mating connector seat and a rear outer peripheral pressure-bearing wall 4 for engagement with a fastening nut 6 mounted on the metal tube 1. The pressure-bearing surface 4 is composed of a steep slant surface 4' extending from a top of the connector head 2 and a gradual or gentle slant surface 4" extending as a skirt integrally therefrom in the rearward direction, the gradual slant surface 4" being inclined to the axis of the metal tube at an angle $\theta$ in the range of from 2° to 5° and having a length l equal to or greater than the outside diameter of the metal tube 2. The reasons for the specified angle of inclination of the gradual slant suface 4" are that if the angle $\theta$ were less than 2°, it would fail to effectively distribute fatiguing stresses due to vibrations of the tube, and if the angle $\theta$ were greater than 5°, stresses would tend to concentrate in a joint 5 between the the gradual slant surface 4" and the uniform diameter portion of the tube. If the length of the gradual slant surface 4" were smaller than the outside diameter of the tube, no stress distribution would be effected by the gradual slant surface 4".

The results of an experiment conducted on a connector head construction of the present invention are shown in Table 1.

Table 1 is indicative of the results of a fatigue test carried out on high-pressure fuel injection tubes made from a material STS-35 through a completely annealing process and having an outside diameter of 6 mm and an inside diameter of 2 mm, with the gradual slant surface 4" having different angles $\theta$ and lengths l. Table 1 shows numbers of repetitive vibrations applied to the tubes under a constant stress until they are broken due to fatigue. The experimental results indicate that the tubes with the angle $\theta$ of the gradual slant surface in the range of from 2° to 5° and the length l thereof equal to or greater than the outside diameter of the tube are excellent in fatigue resistance.

TABLE 1

| | | l | | |
|---|---|---|---|---|
| $\theta$ | stress | 4 mm Number of repetitive vibrations | 7 mm Number of repetitive vibrations | 10 mm Number of repetitive vibrations |
| 1.25°~1.4° | 22 kg/mm$^2$ | 1720000 | 450000 | 693200 |
| | | 1432000 | 1237000 | 596000 |
| | | 924660 | 2630000 | 853000 |
| | | 5011000 | 1070500 | 1529000 |
| 2.2°~2.3° | 22 kg/mm$^2$ | * | * | * |
| | | 3020000 | " | " |
| | | * | " | " |
| | | 1901000 | " | " |
| 3.5°~4.5° | 22 kg/mm$^2$ | * | * | * |
| | | 6830000 | " | " |
| | | 8590000 | " | " |
| | | * | " | " |
| 6.5°~8.0° | 22 kg/mm$^2$ | 321000 | 2130000 | * |
| | | 6930000 | * | 3720000 |
| | | 5326000 | 7310000 | * |

TABLE 1-continued

| $\theta$ | stress | 4 mm Number of repetitive vibrations | 7 mm Number of repetitive vibrations | 10 mm Number of repetitive vibrations |
|---|---|---|---|---|
| | | 809000 | 9326000 | " |

(*: not broken after $10^7$ vibrations)

With the present invention, as described above, the pressure-bearing surface 4 is composed of a steep slant surface 4' extending from a top of the connector head 2 and a gradual or gentle slant surface 4" extending as a skirt integrally therefrom in the rearward direction, the gradual slant surface 4" being inclined to the axis of the metal tube at an angle $\theta$ in the range of from 2° to 5° and having a length l equal to or greater than the outside diameter of the metal tube 2. Therefore, the cross section of in the vicinity of a neck of the connector head varies gradually, and any fatiguing stresses applied to the neck can effectively distributed at the time the connector head is subjected to vibrations in use or forcibly attached in place under undue conditions if the tube is bent to improper shape, with the result that the net will be prevented from being cracked or damaged. Since connector head construction of the invention requires no sleeve washer, it is light in weight and can easily be manufactured.

Although a certain preferred embodiment has been shown and described, it should be understood that many changes and modifications may be made therein without departing from the scope of the appended claim.

What is claimed is:

1. A crack resistent fuel injection tube connection comprising a fastening nut having a generally annular pressure bearing wall and a tube having a generally cylindrical body and a connector head at one end, said connector head being of larger diameter than the cylindrical body of said tube, said connector head comprising a gradually tapered skirt extending outwardly from said cylindrical body at an angle of between approximately 2° and 5° for a distance at least equal to the outside diameter of the tube body, said connector head further including a steeply tapered outer peripheral pressure bearing wall extending outwardly from the end of said skirt opposite the cylindrical body of the tube, the steeply tapered outer peripheral pressure bearing wall being dimensioned and aligned for engagement with the annular pressure bearing wall of the fastening nut whereby the gradually tapered skirt substantially prevents failure in the tube adjacent the fastening nut.

2. A high-pressure fuel injection tube formed from a metallic material for use with a fastening nut having a generally annular pressure bearing wall, said tube having a generally cylindrical body with a small outside diameter and a relatively large wall thickness, one end of said tube defining a connector head having a larger outside diameter than the cylindrical body, said connector head comprising a gradually tapered skirt extending outwardly from said cylindrical body at an angle between approximately 2° and 5° for a distance at least equal to the outside diameter of the tube and a steeply tapered outer peripheral pressure bearing wall extending outwardly at an angle of greater than 5° from the end of said skirt opposite the cylindrical body, the steeply tapered outer peripheral pressure bearing wall being dimensioned and aligned for engagement with the annular pressure bearing wall of the fastening nut whereby the gradually tapered skirt substantially prevents failure in the tube adjacent the fastening nut.

3. A tube as in claim 2 wherein the outside diameter of the body portion is no greater than approximately 20 mm.

4. A tube as in claim 3 including an inside diameter of between about 1.2 mm and about 4.0 mm.

5. A tube as in claim 2 further including an outer pressor wall on the side of the connector head opposite the steeply tapered portion.

* * * * *